UNITED STATES PATENT OFFICE.

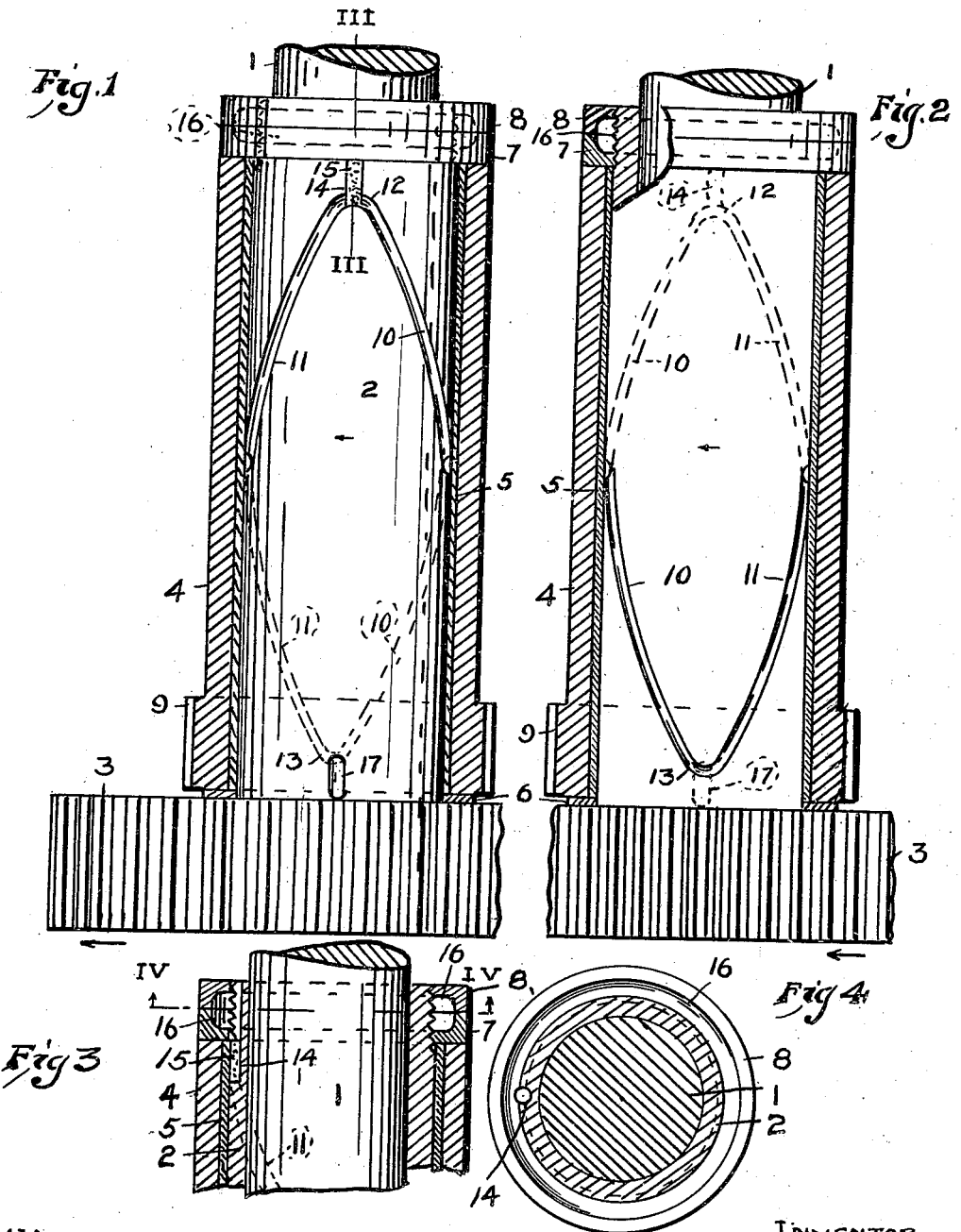

LORENZO E. WAITE, OF TOLEDO, OHIO, ASSIGNOR TO THE TOLEDO MILLING MACHINE COMPANY, OF TOLEDO, OHIO, A CORPORATION OF DELAWARE.

BEARING.

1,426,130.            Specification of Letters Patent.     Patented Aug. 15, 1922.

Application filed October 18, 1920. Serial No. 417,744.

*To all whom it may concern:*

Be it known that I, LORENZO E. WAITE, a citizen of the United States, residing at Toledo, in the county of Lucas and State of Ohio, have invented new and useful Improvements in Bearings, of which the following is a specification.

My invention relates to bearings provided with improved means for lubricating the same. It is illustrated by its application to a vertical bearing for the operation of the spindle of vertical milling machines, but it may be applied to various other bearings, whether vertical, horizontal, or inclined.

It is the object of this invention to provide adequate lubrication for bearings, particularly those to which it is difficult to feed oil by ordinary means. In vertical drilling machines, in which two sleeves rotating in the same direction at different speeds and concentric with the spindle are employed, it is difficult to lubricate the bearing surfaces between the two sleeves. I have provided means for properly lubricating such surfaces, but I do not limit my invention to such surfaces, as I find it may be adopted for lubricating other types of bearing surfaces. My invention provides a great saving of oil and prevents oil from being fed down past the bearing and thence down to the tool in the spindle.

Referring to the accompanying drawing, Fig. 1 is in part a side elevation and in part a vertical section of a structure embodying my invention; Fig. 2, a similar view with the parts rotated axially a half revolution; Fig. 3, a section on the line III—III on Fig. 1; and Fig. 4, a section on the line IV—IV on Fig. 3.

On the drawing, 1 designates the spindle of a vertical milling machine, and 2 the sleeve surrounding the same. The sleeve is keyed to the spindle and has the spur gear 3 secured to its lower end and concentric with the spindle.

4 is a second sleeve externally concentric with the sleeve 2, and separated from the latter by the bronze bearing sleeve 5 rotatable with the sleeve 4. 6 is a bearing ring between the top of the gear 3 and the lower end of the sleeve 4. The upper end of the sleeve 2 is externally threaded and the nut 7 is screwed thereon down on the upper end of the sleeves 4 and 5, but permitting the last named sleeves to turn on the sleeve 2. 8 is a jam nut screwed down on the sleeve 2 and against the nut 7. The sleeve 4 has the pinion 9 at its lower end.

The apparatus thus far described is substantially that shown on the drawings of my application, Serial Number 297,774, filed May 17, 1919.

On the outer cylindrical surface of the sleeve 2 is an endless groove or path, composed in the present instance of a right and a left half-turn of a helical coil, 10 representing one-half turn and 11 the other. These half turns are preferably elongated in the direction of the axis of the spindle or sleeves, and have their upper ends joined at 12 near the upper end of the sleeve 2, and the lower ends joined at 13 near the lower end thereof, so as to form a closed path for oil. The point 12 is joined by the open oil-feed groove 14, extending up on the surface of the sleeve 2 to the top thereof, and provided with the wick 15. The nuts 8 and 9 have registering cavities opening into the feed-groove 14 and forming an oil reservoir 16. Oil is fed into the groove 14 and flows into the reservoir, from which it flows through the wick 15 to the said endless groove or path.

Supposing that both sleeves and gears rotate in the same direction as indicated by the arrows and that the sleeve 4 rotates faster than the sleeve 2, the latter rotates on the former in the same direction. The friction of the sleeve 5 drives the oil down the half turn 11 and up the half turn 10, so that the oil in the turns has an endless travel.

The oil feeds best around this path when the surrounding air is most effectually prevented from having access to the endless groove. The point 12 is practically sealed against the air by the wick 15, but the access of the air to the point 12 might obviously be prevented by other means. The point 13 is sealed against the air by being somewhat above the lower end of the sleeve 2. The film oil between the sleeves 2 and 5 seals the endless groove from the air, but if the point 13 or any part of the endless groove reaches the end of the sleeve 2, air gains access to the groove and destroys the vacuum or partial vacuum, which should exist in the groove to produce most perfectly the endless travel of the oil in the two half turns 10 and 11 and prevent the flowing of the oil from the said turns down over the gear 3.

In order to lubricate properly the bearing surfaces between the sleeves 4 and 5 below the point 13, a short groove 17 is provided in the sleeve 2 out of communication with the endless groove, but having its upper end above the point 13 and its lower end at or close to the lower end of the sleeve 2. As the sleeve 5 turns on the sleeve 2 some oil carried around from the point 13 is received by the groove 17 down which the oil flows to complete the lubrication of the sleeve 2. The upper end of this sleeve is lubricated from the groove 14 or the wick 15, when used.

I claim—

1. A pair of co-operating vertical bearing surfaces, one rotatable on the other, means rotating them in the same direction and at different speeds, a single spiral groove on one of the surfaces, the said groove beginning near the top of the bearing and running thence around the bearing surface 180° to a point slightly above the lower end of the bearing, and thence running around the bearing surface 180° to the point of beginning, the groove making a sharp angle at the lower end of the bearing, and means for feeding lubricant to the said point of beginning.

2. A pair of co-operating vertical bearing surfaces, one rotatable on the other, means rotating them in the same direction and at different speeds, a single spiral groove on one of the surfaces, the said groove beginning near the top of the bearing and running thence around the bearing surface 180° to a point slightly above the lower end of the bearing, and thence running around the bearing surface 180° to the point of beginning the groove making a sharp angle at the lower end of the bearing, means for feeding lubricant to the said point of beginning, and a short groove on one of the surfaces but out of communication with the first groove and extending downwardly below the said sharp angle.

3. A pair of vertical cooperating bearing members, one rotatable within the other, means carried by the inner member and lying upon the upper end of the outer member, an endless groove in the bearing surface of one of the members, an oil reservoir in the said means, and means feeding the oil therefrom to the endless groove.

4. A pair of vertical cooperating bearing members, one rotatable within the other, means carried by the inner member and lying upon the upper end of the outer member, an endless groove in the bearing surface of one of the members, the groove stopping short of the upper end of the outer bearing member, an oil reservoir in the said means, a groove leading from the reservoir to the upper end of the endless groove, and a wick in the former groove.

5. A pair of vertical cooperating bearing members, one rotatable within the other, a nut carried by the inner member and lying on the upper end of the outer member, a jam nut on the first nut, an endless groove in the bearing surface of one of the members, an oil reservoir in the said nuts, and means feeding the oil therefrom to the endless groove.

Signed at Toledo, Ohio, this 7th day of October, 1920.

LORENZO E. WAITE.